2,897,116

DIHYDROTRIAZINES WITH ANTHELMINTIC PROPERTIES

George H. Hitchings, Yonkers, and Barbara Roth, Scarsdale, N.Y., assignors to Burroughs Wellcome & Co. (U.S.A.), Inc., Tuckahoe, N.Y., a corporation of New York No Drawing. Application November 1, 1957
Serial No. 693,800

7 Claims. (Cl. 167—65)

This invention relates to a new group of S-dihydrotriazine compounds which are useful for their effects on intestinal parasites, notably pinworms. The S-dihydrotriazines found to have this unusual activity are represented by the formula

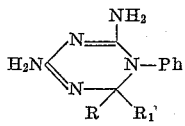

wherein Ph is selected from the class consisting of 2,6-dimethylphenyl, 2-ethylphenyl and 2-butylphenyl radicals and R and $R_1$ represent lower alkyl groups and when combined are selected from the class consisting of the tetramethylene and pentamethylene divalent radicals.

The compounds of the invention differ strikingly from closely related dihydrotriazines known in the art. This is illustrated in the following table which compares the effects of various dihydrotriazines on the elimination of the worm *Syphacia obvelata*. In these experiments mice, infested with the parasite, were given three successive daily doses of drug at the rate of 300 milligrams per kilogram. The parasites eliminated during this period and for one additional day were counted and recorded; the animals then were killed and any remaining worms were counted. The activity is expressed as the percentage of worms eliminated, i.e. worms eliminated over the total number of worms multiplied by 100.

| Compound: | Activity |
|---|---|
| Example 1 | 96 |
| Example 2 | 95 |
| Example 3 | 100 |
| Example 4 | 95 |
| Example 5 | 98 |
| Example 6 | 100 |
| Example 7 | 100 |
| Example 8 | 99 |
| Example 9 | 100 |
| 2,4-diamino-1-(2'-methylphenyl)-6,6 - dimethyl-1,6-dihydro-1,3,5-triazine hydrochloride | 34 |
| as above but the 3'-methylphenyl isomer | 40 |
| as above but the 2',5'-dimethylphenyl homologue | 29 |
| as above but the 2'-methyl-4'-chlorophenyl analogue | 19 |

These new substances are conveniently prepared by the condensation of an aniline, a ketone and dicyandiamide in the present of hydrochloric acid as illustrated in the following examples. Since the free triazines are unstable, having a tendency to rearrange to 2-amino-4-anilinodihydrotriazines, they are preferably prepared and administered as non-toxic salts.

*Preparation of 2,4 - diamino - 1 - (ortho-substituted-aryl)-6,6-substituted-1,6 - dihydro - 1,3,5 - triazines of the invention*

EXAMPLE I

A mixture of 12.1 parts by weight of o-ethylaniline, 9 parts of dicyandiamide, 39 parts of acetone, and 9.94 parts of concentrated hydrochloric acid is heated under reflux for 20 hours. The mixture is cooled, and the white precipitate filtered off and dried. Upon recrystallization from ethanol there is obtained 2'4-diamino-1-(2'-ethylphenyl)-6,6-dimethyl-1,6 - dihydro - 1,3,5 - triazine hydrochloride, melting at 209–211° C.

EXAMPLE II

Following the procedure of Example I, using 2,6-dimethylaniline, there is obtained 2,4-diamino-1-(2',6'-dimethylphenyl)-6,6-dimethyl-1,6-dihydro-1,3,5-triazine hydrochloride, melting at 220° C.

EXAMPLE III

A mixture of 18.6 parts of o-butylaniline, 11.2 parts of dicyandiamide, 49 parts of acetone, and 12.4 parts of concentrated hydrochloric acid is heated under reflux for 21 hours. The mixture is cooled, and ether is added to induce crystallization. The product is filtered off and recrystallized from ethanol. White crystals of 2,4-diamino-1-(2'-n-butylphenyl)-6,6-dimethyl-1,6-dihydro-1,3,5-triazine hydrochloride, melting at 191°, are obtained.

EXAMPLE IV

A mixture of 12.1 parts of o-ethylaniline, 9 parts of dicyandiamide, 39 parts of methyl ethyl ketone, and 9.94 parts of concentrated hydrochloric acid is heated just long enough to get everything into solution, and then allowed to stand 18 hours at room temperature. The reaction mixture is then chilled, resulting in the separation of white crystals. Upon recrystallization from water, there is obtained 2,4 - diamino-1-(2'-ethylphenyl)-6-methyl-6-ethyl-1,6-dihydro-1,3,5-triazine hydrochloride, melting at 195–196° C.

EXAMPLE V

A mixture of 12.1 parts of 2,6-dimethylaniline, 9 parts of dicyandiamide, 40 parts of methyl ethyl ketone, and 9.94 parts of concentrated hydrochloric acid is heated sufficiently to dissolve the reactants, followed by leaving the solution at room temperature for 72 hours. Ether is then added and the solution is chilled for several hours, which results in the separation of white crystals. The product is isolated and recrystallized from water. There is obtained 2,4 - diamino - 1- (2',6'-dimethylphenyl)-6-ethyl-6-methyl-1,6-dihydro-1,3,5-triazine hydrochloride, melting at 210° C.

EXAMPLE VI

Following the procedure of Example I, the reaction of 48.4 parts of o-ethylaniline, 36 parts of dicyandiamide, 160 parts of methyl n-propyl ketone, and 39.8 parts of concentrated hydrochloric acid leads to the formation of 2,4-diamino-1-(2'-ethylphenyl)-6-methyl-6-n-propyl - 1,6 - dihydro-1,3,5-triazine hydrochloride, which after recrystallization from water melts at 201–202° C.

EXAMPLE VII

Following the procedure of Example I the reaction of 12.1 parts of o-ethylaniline, 9 parts of dicyandiamide, 40 parts of cyclopentanone, and 9.94 parts of concentrated hydrochloric acid, leads to the formation of 2,4-diamino-1-(2'-ethylphenyl)-6,6-cyclotetramethylene-1,6 - dihydro- 1,3,5-triazine hydrochloride. This substance after recrystallization from ethyl alcohol melts at 224° C.

EXAMPLE VIII

A mixture of 12.1 parts of 2,6-dimethylaniline, 9 parts of dicyandiamide, 40 parts of cyclohexanone, 9.94 parts of concentrated hydrochloric acid and 20 parts of absolute alcohol is heated under reflux for 18 hours. The mixture is chilled, and the white precipitate filtered off and recrystallized from dilute ethanol. There is obtained 2,4-diamino-1-(2',6'-dimethylphenyl) - 6,6-cyclopentamethylene-1,6-dihydro-1,3,5-triazine hydrochloride, which melts at 295° C.

EXAMPLE IX

Following the procedure of Example I, the reaction of 12.1 parts of o-ethylaniline, 9 parts of dicyandiamide, 40 parts of cyclohexanone, and 9.94 parts of concentrated hydrochloric acid leads to the formation of 2,4-diamino-1-(2'-ethylphenyl) - 6,6 - cyclopentamethylene-1,6-dihydro-1,3,5-triazine hydrochloride. After recrystallization from dilute alcohol, this product melts at 224° C.

The compositions of the present invention may be combined in various ways with pharmaceutical carriers, which may be either liquid or solid, to produce therapeutic compositions suitable for the treatment of pinworm infections. Both the percentage of the triazine incorporated and the nature of the carrier may be varied rather widely. However, due to the instability of the triazines in neutral and alkaline solution, any liquid carrier must be acidic, and in the solid compositions the triazines are presented as their salts with any strong to moderately strong, non-toxic acid. The following examples are illustrative of these uses; obviously many further examples will occur to those versed in the art and are contemplated by the invention.

EXAMPLE X 300 g. of the product of Example II, 1050 g. of lactose and 135 g. of corn starch were mixed mechanically and the mixture was sifted through a 60 mesh screen. It was dampened with a 5% mucilage of acacia (ca. 100 cc.) sifted through a 20 mesh screen, dried and resifted. Magnesium stearate (15 g.) was then mixed in, and the mixture was compressed on 7/16 in. diameter standard cup punches so that the final products weighed 500 mg. each and contained 100 mg. of drug, each.

EXAMPLE XI

A mixture containing the product of Example VII was prepared as above, substituting sucrose for the lactose and using 20% mucilage of acacia to prepare the granule. This was compressed on 5/8 in. diameter flat-faced punches, producing chewing wafers weighing 1500 mg., containing 300 mg. of drug each.

EXAMPLE XII

A syrup of the product of Example VIII was prepared as follows. Methyl paraben (2 g.) was dissolved in 200 ml. hot distilled water and drug (50 g.), sucrose (500 g.) and citric acid (10 g.) and 500 ml. of water were added and the mixture stirred until all was dissolved. Orange flavor (1 ml.) and F, D & C yellow dye #6 (20 mg.) were added and stirred until completely dissolved. Water to make 1000 ml. was added and the solution was filtered. The usual dose (5 ml.=1 teaspoonful) provides 250 mg. of drug.

EXAMPLE XIII

An elixir was made following the directions of Example XII, but substituting the product of Example IX for the drug used above and using 100 ml. of 95% alcohol in place of 100 ml. of the water.

The above compounds, by way of illustration, and their modifications, may be used in the treatment of pinworm infestations. The usual dosage is about 10 mg. per pound of body weight per day for 3 days, given in divided doses.

What we claim is:

1. A dihydrotriazine selected from the class consisting of those having the formula

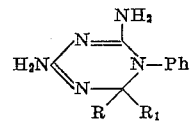

wherein Ph is selected from the class consisting of 2,6-dimethylphenyl, 2-ethylphenyl and 2-butylphenyl radicals and R and $R_1$ represent lower alkyl groups and taken together are selected from the class consisting of the tetramethylene and pentamethylene divalent radicals and their non-toxic salts.

2. A non-toxic salt of 2,4-diamino-1-(2',6' - dimethylphenyl)-6,6-pentamethylene - 1,6-dihydro - 1,3,5 - triazine.

3. A non-toxic salt of 2,4-diamino-1-(2'-ethylphenyl)-6,6-tetramethylene-1,6-dihydro-1,3,5-triazine.

4. A non-toxic salt of 2,4-diamino-1(2'-ethylphenyl)-6,6-pentamethylene-1,6-dihydro-1,3,5-triazine.

5. A non-toxic salt of 2,4-diamino -1-(2'-ethylphenyl)-6-methyl-6-propyl-1,6-dihydro-1,3,5-triazine.

6. A non-toxic salt of 2,4-diamino-1-(2'-ethylphenyl)-6,6-dimethyl-1,6-dihydro-1,3,5-triazine.

7. A method for the elimination of a pinworm infestation which comprises the administration of a dihydrotriazine selected from the class consisting of those having the formula

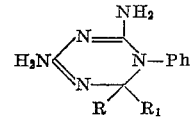

wherein Ph is selected from the class consisting of 2,6-dimethylphenyl, 2-ethylphenyl and 2-butylphenyl radicals and R and $R_1$ represent lower alkyl groups and taken together are selected from the class consisting of the tetramethylene and pentamethylene divalent radicals and their non-toxic salts.

References Cited in the file of this patent

UNITED STATES PATENTS 2,803,628    Crowther _____ Aug. 20, 1957

FOREIGN PATENTS 525,859    Canada _____ June 5, 1956